(12) United States Patent
Neff

(10) Patent No.: US 9,081,259 B2
(45) Date of Patent: *Jul. 14, 2015

(54) CAMERA LENS BODY SHIELD AND FOCUS ASSIST DEVICE

(71) Applicant: Bravin Neff, Royal Oak, MI (US)

(72) Inventor: Bravin Neff, Royal Oak, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/462,757

(22) Filed: Aug. 19, 2014

(65) Prior Publication Data

US 2014/0369674 A1 Dec. 18, 2014

Related U.S. Application Data

(63) Continuation of application No. 14/259,587, filed on Apr. 23, 2014, now Pat. No. 8,818,187.

(60) Provisional application No. 61/854,447, filed on Apr. 24, 2013.

(51) Int. Cl.
G03B 11/00 (2006.01)
G03B 11/04 (2006.01)
G03B 17/56 (2006.01)

(52) U.S. Cl.
CPC ............ *G03B 11/041* (2013.01); *G03B 11/045* (2013.01); *G03B 17/563* (2013.01)

(58) Field of Classification Search
CPC . G03B 11/041; G03B 11/045; G02B 27/0006
USPC .................. 396/448, 544; 359/511, 611, 612
See application file for complete search history.

(56) References Cited

U.S. PATENT DOCUMENTS

| | | | | | |
|---|---|---|---|---|---|
| 3,454,323 | A | * | 7/1969 | Dierks et al. | 359/612 |
| 3,715,149 | A | * | 2/1973 | Freeland | 359/611 |
| 4,549,589 | A | * | 10/1985 | Nguyen | 206/316.2 |
| 5,294,954 | A | * | 3/1994 | Nomura et al. | 396/448 |
| 6,243,540 | B1 | * | 6/2001 | Kume et al. | 396/534 |
| 6,450,651 | B1 | * | 9/2002 | Hoganson | 359/601 |
| 8,818,187 | B1 | * | 8/2014 | Neff | 396/544 |
| 2009/0296221 | A1 | * | 12/2009 | Cheng | 359/611 |
| 2013/0129338 | A1 | * | 5/2013 | Dowell | 396/448 |
| 2014/0016920 | A1 | * | 1/2014 | Luo | 396/144 |

* cited by examiner

*Primary Examiner* — W B Perkey
(74) *Attorney, Agent, or Firm* — Gerald R. Black, Esq.

(57) ABSTRACT

A protective lens cover shields the body of a camera lens from damage. The protective lens cover resembles the shape of the lens being shielded and is essentially the same axial length as the lens—that is, the protective lens cover extends from the lens-camera joint to the outer lens element. Hence, the entire body of the lens is covered except for the lens elements and camera mount surface. On the interior surface of the protective lens cover is a cloth material, such as felt, cotton or velvet, affixed to the main body through an adhesive process like glue or tape. The cloth is the sole feature of the protective lens cover that contacts with the camera lens. The remainder of the interior of the protective lens cover provides a small empty space surrounding the lens body, thereby providing a barrier against damage. The protective lens cover being produced by 3D printing means.

20 Claims, 6 Drawing Sheets

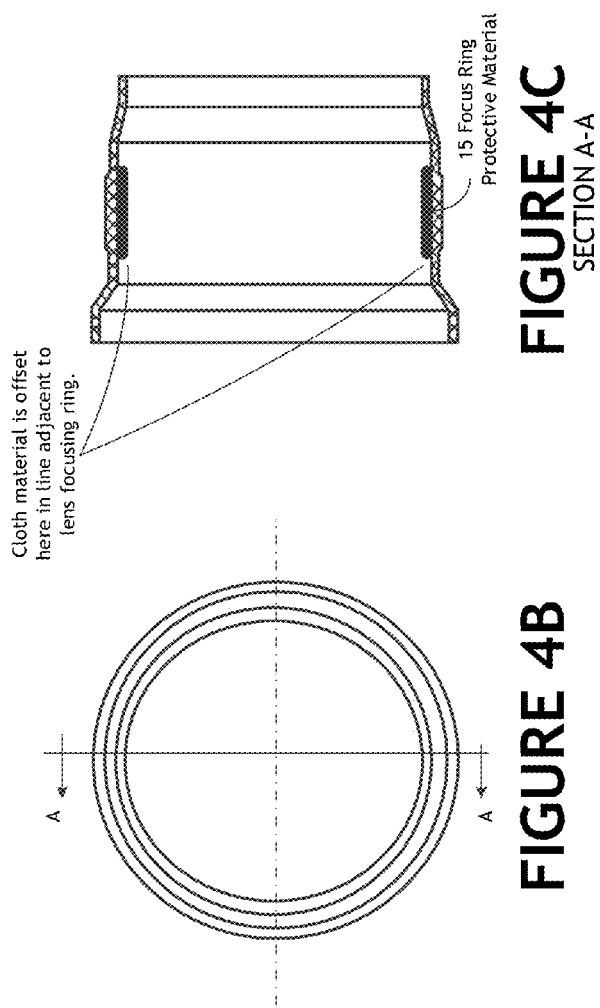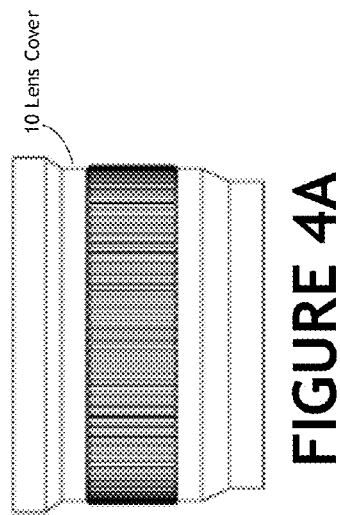

CAMERA LENS BODY SHIELD AND FOCUS ASSIST DEVICE

This application is related to and claims priority to U.S. Provisional Application No. 61/854,447, entitled "Camera Lens Body Shield and Focus Assist Device", by Bravin Neff, filed on Apr. 24, 2013, and is a continuation of U.S. patent application Ser. No. 14/259,587, entitled "Camera Lens Body Shield and Focus Assist Device", by Bravin Neff, filed on Apr. 23, 2014.

FIELD OF USE

The invention relates to a protective cover for a camera lens, and more particularly, to a camera lens cover which enables the full use of said lens while protecting said lens against impacts, scrapes, and other damage which can occur during normal use.

BACKGROUND OF THE INVENTION

Some camera lenses can cost a thousand dollars or more. During normal usage, a camera lens is prone to being damaged in a number of ways; the camera may be dropped, or the lens itself may collide with hard objects.

Numerous devices have been devised to protect camera lenses.

U.S. patent application Ser. No. 13/651,511 (Dowell) discloses a padded protective frusto-conical shaped cup covering sized to slip over a camera lens is disclosed. The covering is designed to fit on either the front portion of the lens or the rear lens mount. The protective covering has beveled side walls which allow it to fit easily on a variety of different lenses. The protective covering is made from two separate layers of material, an outer cup made from a firm yet flexible material, and the inner liner made from a soft pliable material. In one embodiment the outer cup includes a circumferential retaining ring on the inside of the cup to help secure the cup onto a lens.

U.S. Pat. No. 8,672,491 (Immel) discloses An eye guard for use on the eye-end of an optical instrument is provided having an instrument-end member adapted for connection to the optical instrument, an eye-end member adapted to interface with the periocular portion of the user's face, a hinge member disposed between the instrument-end and eye-end members having two flexible annular hinges, and a diaphragm comprising a plurality of segments attached to the interior of the hinge member between the annular hinges. The force of the user's eye pressing the eye-end member toward the instrument-end member deforms the annular hinges such that the normally closed diaphragm segments move to an open position, allowing light to pass through the eye guard.

U.S. Pat. No. 8,358,928 (Appel et al.) discloses a lens guard for protecting a camera. The lens guard includes a lens guard housing, a pressurized gas system, and a gas supply. The housing defines an opening and has a transparent protective lens disposed in the opening and having an outer surface exposed to the environment, an upper portion, and a portion defining apertures shaped to respectively receive therein camera support rods operable to mount the lens-guard housing to the camera in front of a lens.

U.S. Pat. No. 8,292,523 (Dowell) discloses a padded protective cup shaped covering sized to slip over a camera lens. The covering fits onto either the front portion of the lens or the lens mount. The protective covering has beveled side walls which allow it to fit easily on a variety of different lenses.

U.S. Pat. No. 8,118,439 (Cuadra) discloses a selectively positionable lens cover having a lens housing volume and an arcuate lip portion for the selective engagement to and disengagement from a lens. The lens cover has a first engagement structure whereby the first engagement structure may be releaseably engaged with and removed from a second engagement structure.

U.S. Pat. No. 4,349,266 (Maeda) depicts a lens cap formed with not only a lens covering portion for covering the photographic objective lens of a camera, but also with both a portion, such as protection wall for preventing inadvertent operation of the camera shutter release button and a projection for preventing unexpected movement of the operation member of the camera which is adapted for switching the camera from a normal photography condition to a flash photography condition.

What is needed is a protection lens cover that does not interfere with the optical path and need not be removed to capture a photographic image, and can remain on the camera lens indefinitely.

What is needed is a lens cover that protects the entire outer surface of the lens body without covering any of the lens elements or camera-mount surfaces. What is needed is a protection lens cover that provides an interference fit with the focus ring of the lens to preserve the ability of manual focus.

What is needed is a lens cover that provides an interference fit enabling the lens cover to remain in place despite the orientation of the camera. What is needed is a protection lens cover that remains in place on the camera lens if the camera lens is rapidly accelerated through space or if the camera lens is struck by a foreign object. What is needed is a protection lens cover that preserves the resale value of a camera lens.

SUMMARY OF THE INVENTION

The camera lens body shield and focus assist device of the present invention addresses all of these needs.

A primary purpose of the camera lens body shield and focus assist device of the present invention is to prevent damage to a camera lens while, at the same time, enabling the use of all camera and lens functions. The camera lens body shield and focus assist device has the same general shape as the camera lens being shielded and is essentially the same axial length as the lens—that is, the protective lens cover extends from the lens-camera joint to the outer lens element. This reduces bulk, while enabling the normal functions, such as the focus-zoom ring, of the lens to be used. Hence, the entire body of the lens is covered except for the lens elements and camera mount surface. On the interior surface of the protective lens cover is a cloth material, such as felt, cotton or velvet, affixed to the main body with adhesive, glue, tape, bonding agent, or the like. The cloth is the sole feature of the protective lens cover that contacts the camera lens. The remainder of the interior of the protective lens cover provides a small empty space surrounding the lens body, providing a barrier against damage.

For a complete understanding of camera lens body shield and focus assist device, reference is made to the following summary of the invention detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention.

BRIEF DESCRIPTION OF THE DRAWINGS

FIG. 4A depicts the end view, FIG. 4B depicts the top view, and FIG. 4C depicts Section A-A taken from top view of FIG. 4B of the camera lens body shield and focus assist device of FIG. 1.

DETAILED DESCRIPTION OF THE PREFERRED EMBODIMENTS

Figure 1:
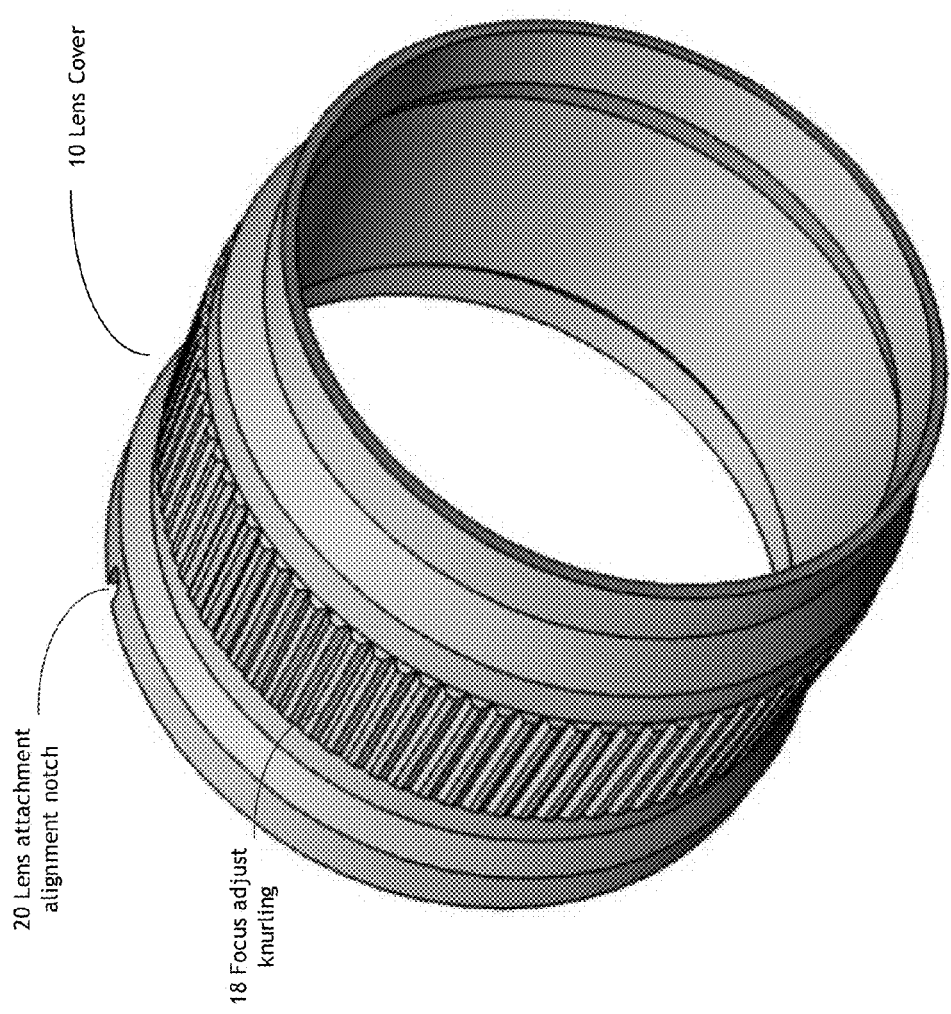
FIG. 1 depicts the preferred embodiment of the camera lens body shield and focus assist device of the present invention.

FIG. 1 is a depiction of the lens cover of the present invention [10] in solid model and wire form from the off-set view with the exterior and interior clearly visible. There is an alignment notch [20] in the surface of the lens cover [10]. The alignment notch [20] is used to align the cover with the lens alignment red-dot which is found on some lenses which are used when attaching lenses to the camera. When the lens cover [10] is attached to the camera, the alignment notch [20] is lined up with the alignment dot on the lens, which enables the user to align the lens when attaching and removing the lens from the camera body. Around the body of the lens cover [10] is focus-adjust knurling [18] which is positioned in the same place as the focus-adjust ring of the lens.

Figure 2:
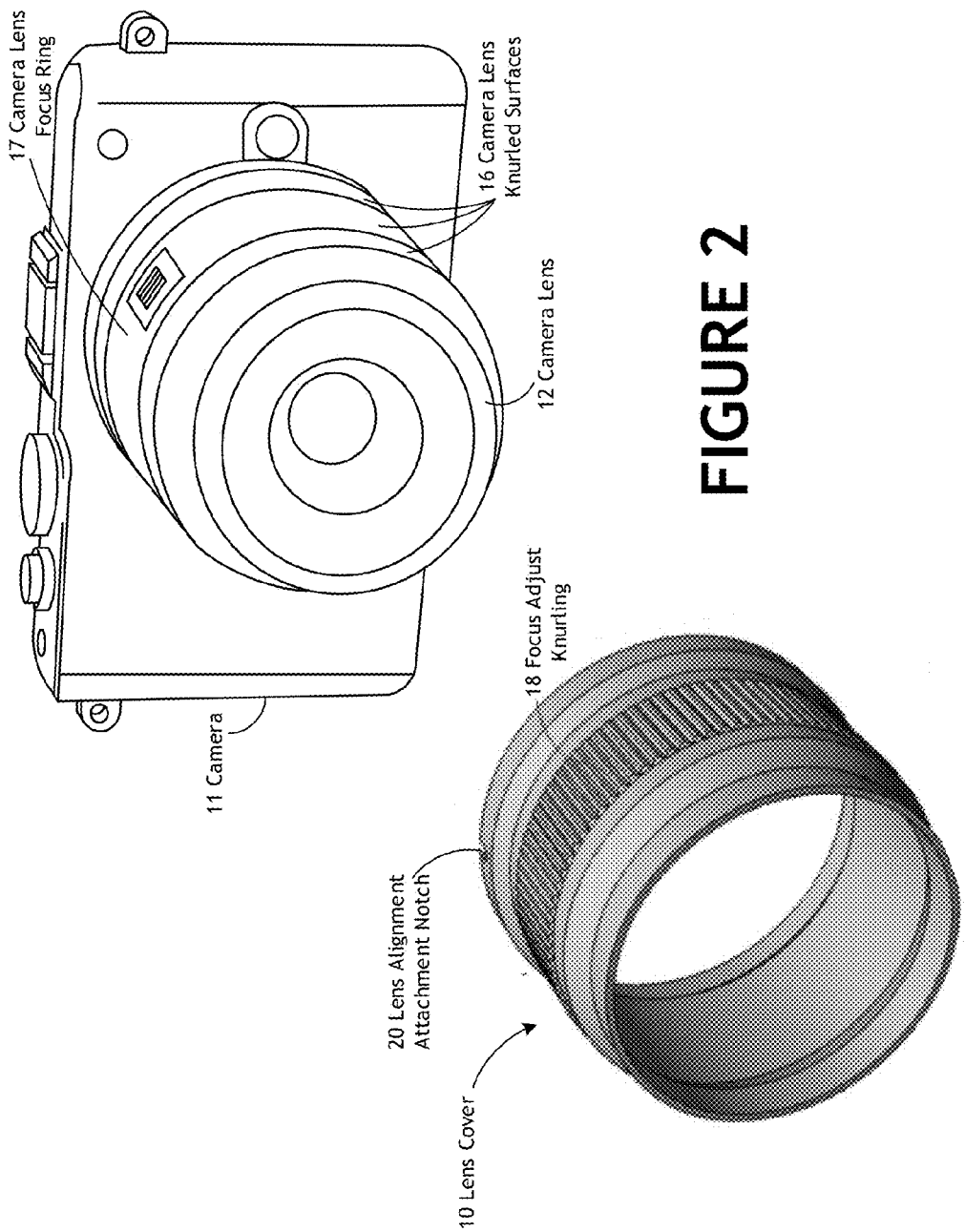
FIG. 2 depicts an assembly view of the camera lens body shield and focus assist device of FIG. 1 and a camera and a camera lens for which is can be used.

FIG. 2 depicts an assembly view of the camera lens body shield and focus assist device of FIG. 1 and a camera [11] and a camera lens [12] for which is can be used.

Figure 3:
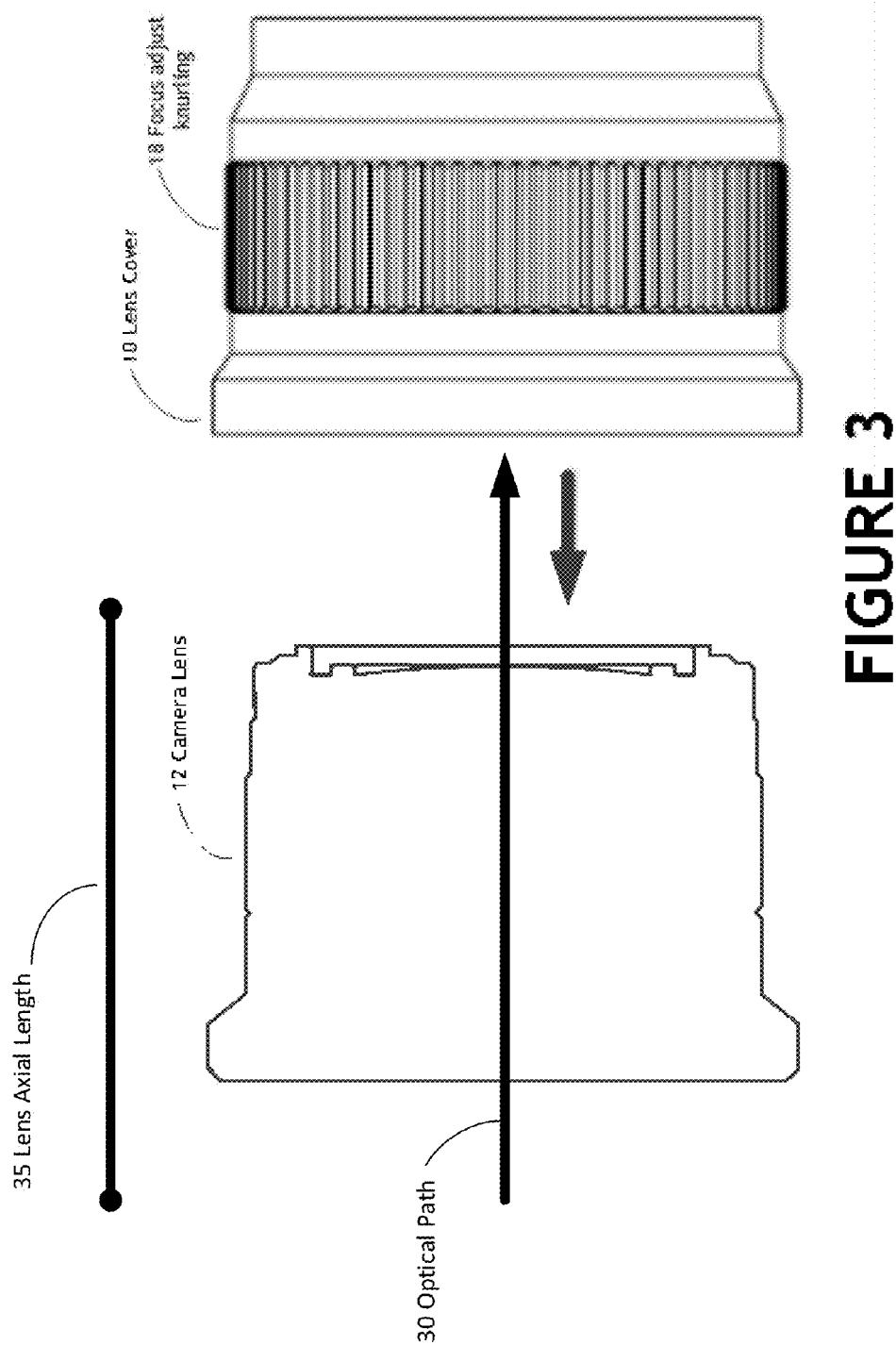
FIG. 3 depicts a camera lens upon which the camera lens and the camera lens body shield and focus assist device of FIG. 1 is mounted.

FIG. 3 depicts the camera lens cover [10] prior to attachment to the camera lens [12] by the user. Also, visible is the focus-adjust knurling [18] which gives tactile feedback to the user during focus-zoom adjustment.

FIG. 4A depicts the end view, FIG. 4B depicts the top view, and FIG. 4C depicts Section A-A taken from top view of lens cover [10]. The lining material [15] is visible in FIG. 4C. The camera lens cover [10] slides over the camera lens [12] and is held in place via the lining material [15] which compresses against the focus ring of the camera lens [12] or the zoom ring. The inside of the lens cover [10] with the lining material [15] is slightly smaller in diameter than the lens [12], which creates an interference fit, firmly affixing the lens cover [10] to the camera lens [12] while still retaining the use of the focus-zoom and all other lens and camera functions. Around the outside of the lens cover [10] is the focus-adjust knurling [18] which is positioned in the same place as the focus-adjust ring of the camera lens to allow ease of use.

Figure 5:
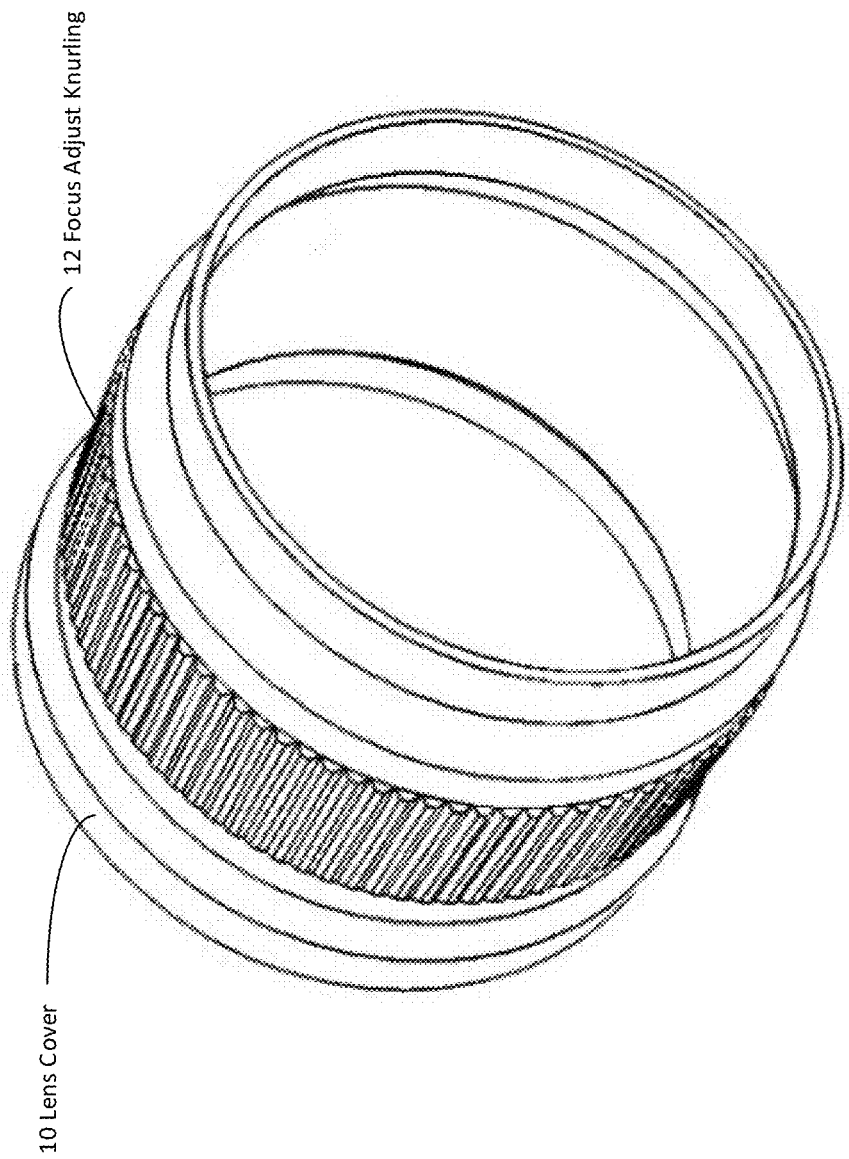
FIG. 5 depicts camera lens body shield of FIG. 1 without the alignment notch.

FIG. 5 depicts an isometric view of the lens cover [10] without an alignment notch to be used on camera's on which there is no need for the alignment notch [20].

Figure 6:
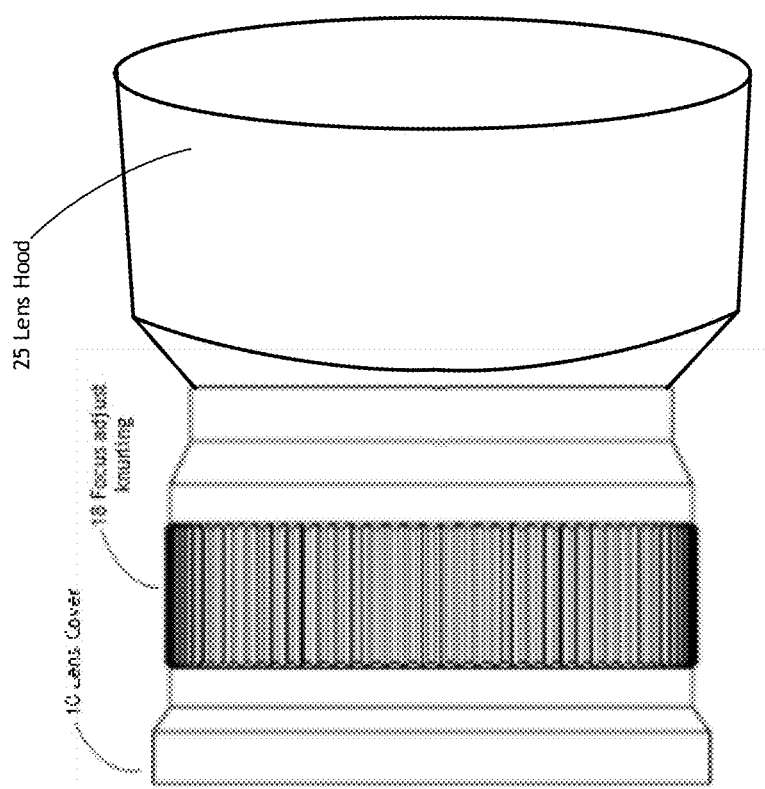
FIG. 6 depicts the camera lens body shield of FIG. 1 with a lens hood.

FIG. 6 depicts the lens cover [10] which is longer than the axial length of the lens which has a lens hood attachment.

The lens cover [10] is lens specific and made from a light weight material, while being the same axial length of the lens, preventing any interference with lens accessories, such as lens filters and hoods, while allowing the user to have a cover for each lens, not requiring the user to constantly remove and replace the lens cover [10]. This will prevent the user from needing to move the cover from lens to lens every time a lens is changed, thereby reducing the likelihood of losing the lens cover [10]. The lens cover [10] can also be less than or greater than the axial length of the lens. When the lens cover [10] is greater than the axial length of the lens, permanently attached accessories may be used, such as a lens hood [25].

The lens cover lining material [15] is adhered to the inside of the lens cover [10] via glue or double-sided adhesive tape and can be replaced if it wears out from usage. As a result of the interference fit created by the lining material [15] and the protective lens cover [10], the cover remains on the lens even if the camera is accelerated through space as occurs when the camera is dropped or bumped against various objects during normal usage.

The inside diameter of the lens cover [10], with cloth, is slightly smaller than the outside diameter of the focus ring of the lens body, creating an interference fit. The interference is made possible through compliance or compression of the lens cover lining material [15]. The focus ring of the camera lens [12] is therefore manipulated through contact with the cloth material, which is in turn manipulated by the entire body of the invention. Thus the entire outer surface of the lens cover [10] becomes an extension of the focus ring (which by comparison is generally narrower) and can be touched anywhere on its body, by the camera operator, to manipulate focus. The lens cover [10] has focus adjust knurling [18] which is positioned in the same location on the cover [10] as the focus-zoom ring, maintaining the same kind of feel as the lens.

Unlike other camera lens shields, which are either permanently affixed, or prevent the use of the focus mechanism, the camera lens body shield and focus assist device does not need to be removed to utilize the focus ring. Even if the operator elects autofocus, the manual focus ability is maintained if the operator wants it. The device can be left on the lens indefinitely. In other alternative embodiments the device of the present invention can be removed and stored separately. In the micro 4/3 camera segment, of which this shield is ideally suited, there is nothing currently in existence which protects the lens, while allowing normal use. Also, other lens protectors are intended for use when the camera lens is not in use, either for transportation or for protecting the lens while it is not being used and is not mounted to the camera. The camera lens body shield and focus assist device of the present invention [10] provides the necessary impact and scratch protection while not adversely interfering with the optical path of the camera lens [12], enabling full lens and camera functionality.

By preventing damage to the lens, which aside from the camera body, can be the most expensive part of a camera system, the resale value is preserved, enabling the user to maximize the potential resale value of their camera system.

Additionally, the camera lens body shield and focus assist device [10] of the present invention may incorporate ribs or splines that resemble the focus rings on commercial camera lenses. This provides additional realism with a visual resemblance to the lens being shielded and the focusing functionality is enhanced.

The camera lens body shield of the present invention [10] may be produced utilizing 3D printing technology currently available from companies such as Zortrax, which recently sold several thousand units to Dell Corp., MakerBot, Stratasys etc. Or, the camera lens body shield of the present invention [10] can be made more conventionally utilizing injection molding.

In the 3D printing process, the CAD files are uploaded to the machine, or sent to a service, such as i.materialize, and the machine then "prints" the item, in this case the camera lens protective cover. The material the lens cover is printed from is plastic, but can be one of a large range of materials currently printable (e.g., nylon, stainless steel, etc.). For printing plastic parts a spool of plastic material is fed through the printer head and heated to its melting point allowing the printing to start. Once the optimal temperature has been reached, the printer begins to print the item, one layer at a time. This process, while slow, is very precise and allows for easy changes if the part happens to be out of specification, which is not the case in traditional injection molding. If a part is out of spec in injection molding, the mold tooling will need to be reworked and possibly even replaced, which can be very expensive and time consuming. There is also the high initial cost of mold tooling Also, injection molding frequently requires a minimum order to create an economy of scale, otherwise the cost per unit is prohibitively high. With a 3d printer, any quantity can be printed for a reasonable cost.

Throughout this specification, various Patent and Applications are referenced by application number and inventor. The disclosures of these Patents and Applications are hereby incorporated by reference in their entireties into this specification in order to more fully describe the state-of-the-art.

It is evident that many alternatives, modifications, and variations of the camera lens body shield and focus assist device will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

PARTS LIST

10. Lens Cover
11. Camera
12. Camera Lens
14. Camera Lens Knurling
15. Focus Ring Protective Material
16. Camera Lens Knurled Surfaces
17. Camera Lens Focus Ring
18. Focus Adjustment Knurling
20. Lens Alignment Notch
25. Lens Hood

I claim:

1. A lens cover for protecting a camera lens, said lens cover having a contoured inner surface that essentially matches an outer surface of said camera lens, said lens cover having a lining material disposed internally which contacts said outer surface of said camera lens, said lining material firmly affixing said lens cover to said camera lens, said lining material maintaining an interference fit between said lens cover and said camera lens to secure said lens cover in place over said camera lens, said lens cover protecting a body of said camera lens, said lens cover including a portion that does not contact said camera lens, said portion that does not contact said camera lens providing a barrier against damage to said camera lens.

2. The lens protecting device of claim 1, wherein said protecting device is made using 3D printing means, a CAD model of said protecting device for said camera lens being uploaded to said 3D printer means and said lens protecting device is printed using a printing material.

3. The lens protecting device of claim 1, wherein an optical path of said camera lens is unaffected by said lens protecting device, enabling normal function of a camera lens.

4. The lens protecting device of claim 1, wherein said lining material being a cloth-like material that is adhered to an inside surface of said lens cover.

5. The lens protecting device of claim 1, wherein said protecting device is less than an axial length of said camera lens enabling use of lens accessories.

6. The lens protecting device of claim 5, wherein said protecting device is equal to said axial length of said camera lens.

7. The lens protecting device of claim 5, wherein said protecting device is greater than said axial length of said camera.

8. A device for protecting a lens of a camera, said device having a contoured inner surface that closely matches the outer surface of a camera lens and an inner lining material which contacts a focus or zoom ring of said camera lens, said lining material providing an interference fit, said lining material firmly affixing said lens cover to a camera lens enabling use of a focus or zoom function of said camera lens while said lens protecting device is affixed about said camera lens, said lining material maintaining a fit between said protecting device and said camera lens to secure said protecting device in place over said camera.

9. The lens protecting device of claim 8, wherein said protecting device is made using 3D printing means, a CAD model of said protecting device for said camera lens being uploaded to said 3D printer means and said lens protecting device is printed using a printing material.

10. The lens protecting device of claim 8, wherein said ribs, splines, or knurling, are disposed in a same place as a focus or zoom ring on said lens, enhancing tactile feel and functionality of said lens protective cover.

11. The lens protecting device of claim 8, wherein said lining material being a cloth-like material that is adhered to an inside surface of said lens cover.

12. The camera lens protecting device of claim 8, wherein an optical path of a lens is unaffected by said device, enabling normal function of a camera lens.

13. The camera lens protecting device of claim 8, wherein said protecting device is an axial length of said camera lens, said axial length enabling the use of lens accessories.

14. The camera lens protecting device of claim 8, wherein said protecting device is an axial length of said camera lens, a length of said protecting device is greater than said axial length of said camera lens.

15. A device for protecting a lens of a camera, said device having a contoured inner surface that closely matches the outer surface of a camera lens; ribs, splines, or knurling disposed on an outer surface of said protecting device; and an inner lining material which contacts a focus or zoom ring of said camera lens, said lining material providing an interference fit, said lining material being a cloth-like material that is adhered to an inside surface of said protective device, said lining material firmly affixing said lens cover to a camera lens enabling use of a focus-zoom function of said camera lens while said lens protecting device is affixed about said camera lens, said lining material maintaining a fit between said protecting device and said camera lens to secure said protecting device in place over said camera.

16. The lens protecting device of claim 15, wherein said protecting device is made using 3D printing means, a CAD model of said protecting device for said camera lens being uploaded to said 3D printer means and said lens protecting device is printed using a printing material.

17. The lens protecting device of claim 15, wherein said ribs, splines, or knurling, are disposed in a same place as a focus or zoom ring on said lens, enhancing tactile feel and functionality of said lens protective cover.

18. The camera lens protecting device of claim 15, wherein an optical path of a lens is unaffected by said device, enabling normal function of a camera lens.

19. The camera lens protecting device of claim 15, wherein said protecting device is an axial length of said camera lens, said axial length enabling the use of lens accessories.

20. The camera lens protecting device of claim 15, wherein said protecting device is an axial length of said camera lens, a length of said protecting device is greater than said axial length of said camera lens.

* * * * *